(12) United States Patent
Thommana et al.

(10) Patent No.: US 7,962,089 B1
(45) Date of Patent: Jun. 14, 2011

(54) METHOD AND SYSTEM OF SUPPORTING POLICY BASED OPERATIONS FOR NARROWBAND TACTICAL RADIOS

(75) Inventors: John Thommana, Cedar Rapids, IA (US); Lizy Paul, Cedar Rapids, IA (US); Roy C. Moore, Cedar Rapids, IA (US); David R. Campbell, Robins, IA (US); Steven J. Zaugg, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 531 days.

(21) Appl. No.: 11/824,714

(22) Filed: Jul. 2, 2007

(51) Int. Cl.
*H04H 20/71* (2008.01)
(52) U.S. Cl. ...... 455/3.01; 455/41.2; 455/416; 455/519; 370/260; 370/395.2; 370/432; 709/249; 709/223; 709/232
(58) Field of Classification Search .......... 455/41.1, 455/41.2, 3.01, 416, 410, 412.1, 422.1, 518, 455/519, 90.1, 90.2, 431; 370/338, 389, 370/328, 260, 432, 395.2, 231; 709/225, 709/228, 249, 223, 226, 200, 203, 206, 232, 709/231, 227, 245
See application file for complete search history.

(56) References Cited

U.S. PATENT DOCUMENTS

| | | | |
|---|---|---|---|
| 5,497,504 A | 3/1996 | Acampora et al. | |
| 6,574,453 B1 | 6/2003 | Honda et al. | |
| 6,714,515 B1 | 3/2004 | Marchand | |
| 6,714,987 B1 | 3/2004 | Amin et al. | |
| 7,061,896 B2 | 6/2006 | Jabbari et al. | |
| 7,149,524 B2 | 12/2006 | Reynolds | |
| 7,227,865 B2 | 6/2007 | Shaheen et al. | |
| 7,536,471 B2 * | 5/2009 | Oliver et al. | 709/232 |
| 7,586,514 B1 * | 9/2009 | Salazar et al. | 348/144 |
| 2003/0027551 A1 * | 2/2003 | Rockwell | 455/410 |
| 2004/0165587 A1 * | 8/2004 | Kiyoto et al. | 370/389 |
| 2004/0264403 A1 * | 12/2004 | Fette et al. | 370/328 |
| 2005/0226172 A1 * | 10/2005 | Richardson et al. | 370/260 |
| 2006/0104232 A1 * | 5/2006 | Gidwani | 370/328 |
| 2006/0233166 A1 * | 10/2006 | Bou-Diab et al. | 370/389 |
| 2006/0235973 A1 * | 10/2006 | McBride et al. | 709/226 |
| 2007/0094394 A1 * | 4/2007 | Singh et al. | 709/226 |
| 2007/0186281 A1 * | 8/2007 | McAlister | 726/14 |
| 2008/0109679 A1 * | 5/2008 | Wright et al. | 714/37 |
| 2008/0183853 A1 * | 7/2008 | Manion et al. | 709/223 |
| 2008/0267144 A1 * | 10/2008 | Jano et al. | 370/338 |
| 2008/0293419 A1 * | 11/2008 | Somasundaram et al. | 455/437 |
| 2009/0019156 A1 * | 1/2009 | Mo et al. | 709/225 |

* cited by examiner

*Primary Examiner* — Sujatha Sharma
(74) *Attorney, Agent, or Firm* — Matthew J. Evans; Daniel M. Barbieri

(57) ABSTRACT

A radio network having more than one radio node is disclosed having a cell broadcast system configured to broadcast network policies. The network includes a first group of radio nodes configured to receive the broadcast network policies. The first group of radio nodes is configured to both receive and send the network policies. A second group of radios receives the network policies from the first group of radios.

12 Claims, 3 Drawing Sheets

METHOD AND SYSTEM OF SUPPORTING POLICY BASED OPERATIONS FOR NARROWBAND TACTICAL RADIOS

BACKGROUND

The Navy Advanced Narrowband System (ANS)/Mobile User Objective System (MUOS) is being developed as a replacement to the UFO constellation. It will provide global SATCOM narrowband (64 kpbs and below) connectivity for voice, video and data for U.S. and Allied services.

The Mobile User Objective System (MUOS) will be a network of DOD-controlled satellites and associated ground facilities providing narrowband BLOS communication services for a worldwide population of mobile and fixed site terminal users. The ground control segment will feature a distributed, government-controlled, precedence and priority based resource management system that will be responsive to the communication requirements of commanders with apportioned resources.

Advanced narrowband communications technology and the Navy's Mobile User Objective System (MUOS) will replace the current Navy Fleet Satellite Communications (FltSat) satellites and Ultra High Frequency Follow-On (UFO) communications satellite constellation over the next two decades. The Navy's UHF communications satellite constellation currently provides narrowband tactical satellite communications to the Defense Department warfighter. The UHF Follow-On constellation, initially launched in 1993, will begin to reach the end of its design life early in the 21st century.

The ARC-210 Radio supports multiple narrowband waveforms like SINCGARS, SATURN, HAVEQUICK-I/II etc. The configuration for these waveforms are manual and tedious. Therefore, it may be beneficial to have some level of dynamic configuration control. However, most waveforms do not support or support only a limited form of dynamic configuration control. The ARC-210 Gen5+ variants support an AUX receive channel in addition to the main transmit and receive chain. This AUX channel is an enhanced version of the traditional guard channel. Supporting MUOS receive over the AUX channel is one of the key design considerations for the ARC-210 Gen5 radio.

Tactical networks are becoming large and complicated. Mission planning is becoming more complex and mission planning skills, knowledge base and personnel are increasingly difficult to find. This is forcing the mission planners to use policy based network and service management in order to achieve higher efficiencies.

Policy based mission planning and distribution is the new and effective way to manage complex, hierarchical, concurrent, multi-level, inter-related multi-service missions. An opportunity for introducing policy based management to legacy tactical radio terminals and services via a software only change.

The techniques herein below extend to those embodiments which fall within the scope of the appended claims, regardless of whether they accomplish one or more of the above-mentioned needs.

SUMMARY

What is provided is a radio network having more than one radio node. The radio network includes a cell broadcast system configured to broadcast network policies. The radio network also includes a first group of radio nodes configured to receive the broadcast network policies. The first group of radio nodes is configured to both receive and send the network policies. The radio network further includes a second group of radios, the second group of radios receives the network policies from the first group of radios.

What is also provided is a method of distributing network policies for a radio network of radio nodes. The method includes generating policies by a policy broadcast system. The method also includes sending, by the policy broadcast system, the policies to a first type of network radio node. Further, the method includes receiving, on a receive only channel by the first type of network radio node, the policies. Further still, the method includes sending, by the first type of radio network node, the policies to a second type of network radio node.

What is further provided is a policy based mission configuration system. The policy based mission configuration system includes a mission planner. The system also includes policy creator and a policy distribution system. Further, the system includes at least one policy distribution point. A group of radio nodes are different from the at least one policy distribution point and receive policies from the policy distribution point.

Alternative exemplary embodiments relate to other features and combinations of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Figure 1:
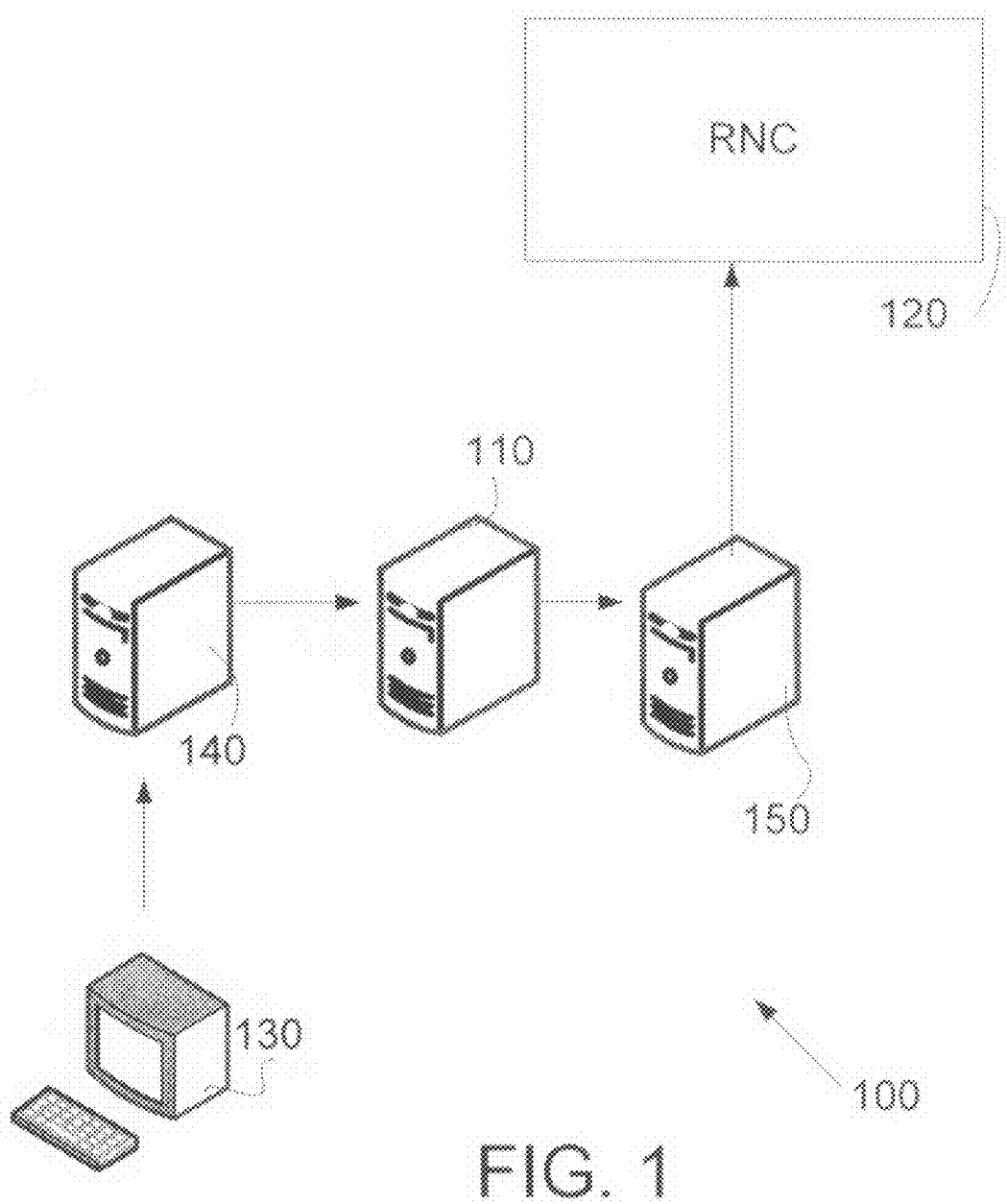
FIG. 1 is an exemplary diagram of a cell broadcasting system in accordance with an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In accordance with an exemplary embodiment, it may be desirable to use cell broadcast capability of MUOS (UMTS) and dual mode ARC-210 radios for policy distribution. Cell broadcast is a feature of UMTS (3G Cellular Standards) that supports definition and distribution of text and/or binary messages to every terminal in a cell.

Referring to FIG. 1, a cell broadcasting system 100 includes Cell Broadcast Entity (CBE) 110. CBE 110 is an authorized terminal that can send content to be broadcast. The content can be broadcast in selected cells or all cells connected to a specific Radio Network Controller (RNC) 120. To begin the process a mission planner interfaces with PC 130 to develop policies with policy creator 140. A Cell Broadcast Center (CBC) 150 is a node in the UMTS Core Network. It connects the cell broadcast entities to the radio network controllers using a standardized interface.

In accordance with an exemplary embodiment, the UMTS standards support up to 65,000 broadcast channels. Each cell broadcast message can be 1252 bytes long with 6 bytes being used for the cell broadcast message header. The UMTS standards support two types of cell broadcast scheduling.

Two types of scheduling are supported to permit power savings at the terminal. The contents of the broadcast messages can be independently encrypted or Security aware broadcast channels can be supported. Terminals with appropriate keys can unlock appropriate broadcast channels.

In accordance with an exemplary embodiment, a policy based mission configuration system may comprises the following:

Mission Planner,
Policy Creator,
Policy Distribution System (CBE, CBC and RNC), and
Policy Distribution Points (Dual Mode ARC-210 Radios).

Legacy narrowband tactical terminals will be configured with information to communicate with policy distribution points. Policy distribution points are dual-mode ARC-210 radios. These dual mode radios will support a receive only MUOS Emission Controlled (EMCON) operation mode and be a part of one or more narrowband tactical networks.

The ARC-210 radios will be configured with the keys to decode one or more cell broadcast channels. Each broadcast channel can be assigned to a narrowband network of which the ARC-210 radio is a participant (depicted as solid line). The dual mode terminal will forward the policy to the narrowband legacy network users (depicted as dashed line).

Figure 2:
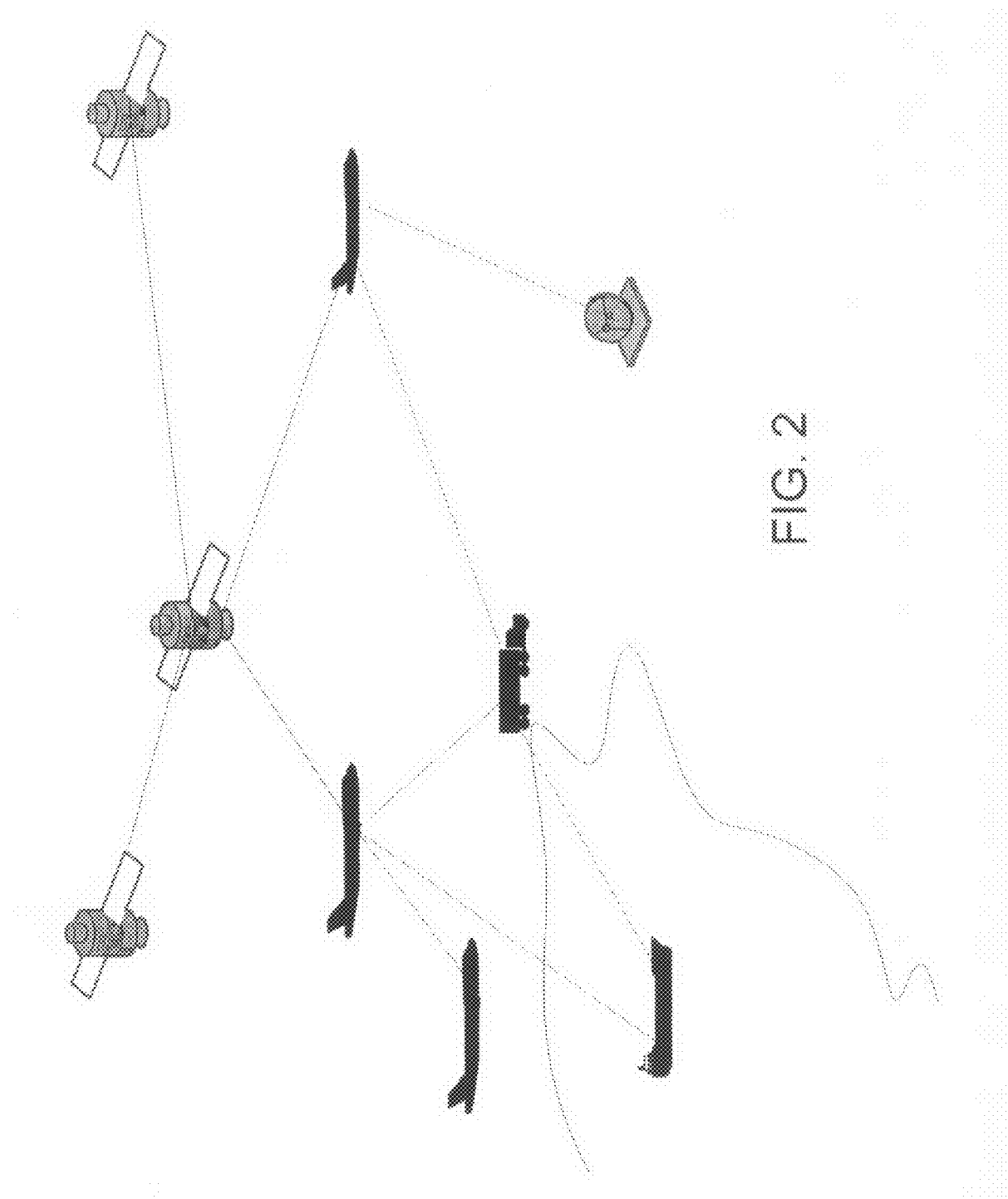
FIG. 2 is an exemplary diagram of a radio network configuration in accordance with an exemplary embodiment.

FIG. 2 depicts such a network configuration. In accordance with an exemplary embodiment, a dual-mode ARC-210 radio may be configured as a receive only node in a global MUOS network. The MUOS Radio Access Facility will be used to perform the base station functions of the UMTS standards.

Figure 3:
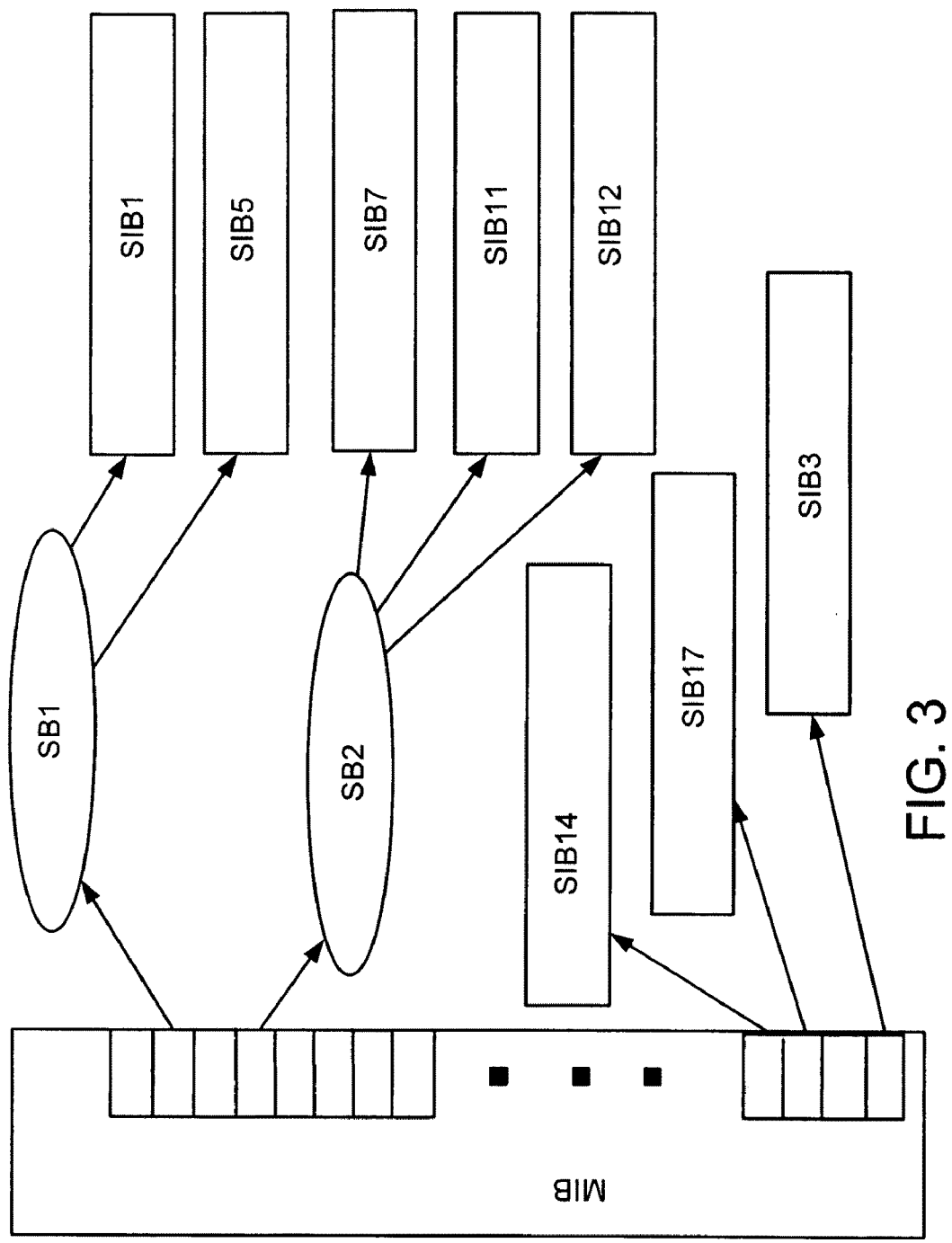
FIG. 3 is an exemplary diagram of a policy exchange system in accordance with an exemplary embodiment.

In accordance with an exemplary embodiment, UMTS Radio Resource Controller (RRC) Subscriber Information Block (SIB) may be used to exchange policies. The UMTS uses a system broadcast channel to communicate information useful to all subscribers residing in a particular cell. MUOS uses the same mechanism with adaptations for the MUOS needs. In an exemplary embodiment, there may be spare SIB's available that can be used to exchange policies (see FIG. 3). These SIB's can be used to exchange small amounts of data in a cell. The drawback of this method is that there is no direct access from external entities to influence the contents of the SIB's. This method will be a substantial deviation from both the UMTS and MUOS standards. In one embodiment, there are only a limited number of SIB's defined thereby limiting the number of simultaneous policies that can be supported.

Another embodiment of this invention is to use the MUOS network with the policy management framework to distribute near real-time encrypted intelligence broadcast using a common format. Supporting the eXtensible Markup Language (XML) based Common Message Format (CMF) will ensure that all IBS-CIBS capabilities can be exchanged over MUOS and distributed to legacy terminals with decoding capabilities. Policies can be setup to determine the recipients of the information in the legacy network to add selectivity capabilities.

There may be numerous advantages of policy based tactical operations, including but not limited to:

Dynamic Admission Control,
Dynamic QoS,
Location Based Services,
Conditional Policies can be used to react to specific event triggers,
Reduce Network Management Overheads,
Automated mission configuration with limited operator intervention, and
Reduction in human errors while configuring mission logistics.

Future variants of the ARC-210 radios may support simultaneous full-duplex multi-channel transmissions. This full duplex MUOS communication capability may permit additional features including but not limited to:

Traffic Control and Shaping,
Monitoring and Configuration,
Automated data collection,
Mobile Intelligent Agents with data fusion capabilities,
Automated fault management, and
Mission Aware Situational Awareness.

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. A radio network, comprising:
a cell broadcast system configured to broadcast network policies, the cell broadcast system including a cell broadcast entity, the cell broadcast entity being a terminal authorized to send the network policies to be broadcast, the cell broadcast system further including a cell broadcast center, the cell broadcast center being communicatively coupled to the cell broadcast entity, the cell broadcast center being configured for connecting the cell broadcast entity to a radio network controller, the cell broadcast system being configured for selecting between broadcasting the network policies in selected cells or broadcasting the network policies in all cells connected to the radio network controller, the cell broadcast system being configured for supporting a first type of cell broadcast scheduling in which contents of broadcast messages are independently encrypted, the cell broadcast system also being configured for supporting a second type of broadcast scheduling in which security aware broadcast channels are supported, wherein said security aware broadcast channels are configured for being unlocked via keys of at least one terminal of the radio network;
a first group of radio nodes, said first group of radio nodes being communicatively coupled to the cell broadcast system, the first group of radio nodes being configured to receive the broadcast network policies in a first format, the first group of radio nodes further configured to transmit the broadcast network policies in a second format; and
a second group of radio nodes, said second group of radio nodes being communicatively coupled to the first group of radio nodes, the second group of radio nodes being configured for receiving the transmitted network policies in the second format from the first group of radio nodes.

2. The radio network of claim 1, wherein the cell broadcast system further comprises a MUOS system.

3. The radio network of claim 1, wherein the first group of radio nodes includes dual-mode ARC-210 radios configured for supporting a receive only MUOS EMCON operation mode.

4. The radio network of claim 1, wherein the second group of radio nodes includes legacy radios.

5. The radio network of claim 1, wherein the network policies are encrypted.

6. A method of distributing network policies for a radio network, comprising:
generating the network policies by a policy broadcast system, the policy broadcast system including a cell broadcast entity, the cell broadcast entity being a terminal authorized to send the network policies to be broadcast, the policy broadcast system further including a cell broadcast center, the cell broadcast center being communicatively coupled to the cell broadcast entity, the policy broadcast system further including a radio network controller, the cell broadcast center being configured for connecting the cell broadcast entity to the radio network controller, the policy broadcast system being configured for selecting between broadcasting the network policies in selected cells or broadcasting the network policies in all cells connected to the radio network controller, the policy broadcast system being configured for supporting a first type of cell broadcast scheduling in which contents of broadcast messages are independently encrypted, the policy broadcast system also being configured for supporting a second type of broadcast scheduling in which security aware broadcast channels are supported, wherein said security aware broadcast channels are configured for being unlocked via keys of at least one terminal of the radio network;
sending, by the policy broadcast system, the network policies to a first type of network radio node included in the radio network;
receiving, on a receive only channel by the first type of network radio node, the network policies, the network policies being in a first format;
sending, by the first type of radio network node, the network policies in a second format to a second type of network radio node included in the radio network.

7. The method of claim 6, wherein the policy broadcast system further comprises a MUOS system.

8. The method of claim 6, wherein the first type of radio network node is an ARC-210 radio.

9. The method of claim 6, wherein the second type of radio network node is a legacy radio.

10. The method of claim 6, wherein the network policies are encrypted.

11. A policy based mission configuration system, comprising:
a mission planner node;
a policy creator node, the policy creator node being communicatively coupled to the mission planner node, the policy creator node configured for creating policies based upon an interfacing with the mission planner node;
a policy distribution system, the policy distribution system being communicatively coupled to the policy creator node, the policy distribution system configured for receiving the policies from the policy creator node, the policy distribution system including a cell broadcast entity, the cell broadcast entity being a terminal authorized to send the network policies to be broadcast, the policy distribution system further including a cell broadcast center, the cell broadcast center being communicatively coupled to the cell broadcast entity, the policy distribution system further including a radio network controller, the cell broadcast center being configured for connecting the cell broadcast entity to the radio network controller, the policy distribution system further comprising a MUOS system, the policy distribution system being configured for selecting between broadcasting the network policies in selected cells or broadcasting the network policies in all cells connected to the radio network controller, the policy distribution system being configured for supporting a first type of cell broadcast scheduling in which contents of broadcast messages are independently encrypted, the policy distribution system also being configured for supporting a second type of broadcast scheduling in which security aware broadcast channels are supported, wherein said security aware broadcast channels are configured for being unlocked via keys of at least one terminal of the radio network;
at least one policy distribution point, the at least one policy distribution point being communicatively coupled to the policy distribution system, the at least one policy distribution point being configured for receiving the policies from the policy distribution system in a first format, the at least one policy distribution point being configured for transmitting the policies in a second format, wherein the at least one policy distribution point includes a dual-mode ARC-210 radio, the dual-mode ARC-210 radio configured with one or more cell broadcast channel decoding keys for decoding one or more broadcast channels; and
a group of radio nodes that are different from the at least one policy distribution point, the group of radio nodes being communicatively coupled to the at least one policy distribution point, the group of radio nodes being configured for receiving the policies in the second format from the at least one policy distribution point, wherein the group of radio nodes includes legacy radios.

12. A radio network, comprising:
a cell broadcast system configured to broadcast encrypted network policies, the cell broadcast system including a cell broadcast entity, the cell broadcast entity being a terminal authorized to send the network policies to be broadcast, the cell broadcast system further including a cell broadcast center, the cell broadcast center being communicatively coupled to the cell broadcast entity, the cell broadcast center being configured for connecting the cell broadcast entity to a radio network controller, the cell broadcast system being configured for selecting between broadcasting the network policies in selected cells or broadcasting the network policies in all cells connected to the radio network controller, the cell broadcast system being configured for supporting a first type of cell broadcast scheduling in which contents of broadcast messages are independently encrypted, the cell broadcast system being further configured for supporting a second type of broadcast scheduling in which security aware broadcast channels are supported, wherein said security aware broadcast channels are configured for being unlocked via keys of at least one terminal of the radio network;

a first group of radio nodes, the first group of radio nodes being communicatively coupled to the cell broadcast system, the first group of radio nodes being configured to receive the encrypted network policies in a first format and being further configured to transmit the encrypted network policies in a second format; and a second group of radio nodes, the second group of radio nodes being communicatively coupled to the first group of radio nodes, the second group of radio nodes being configured for receiving the encrypted network policies in the second format.

\* \* \* \* \*